(12) United States Patent
Loc (10) Patent No.: US 7,889,634 B1
(45) Date of Patent: Feb. 15, 2011

(54) METHOD AND APPARATUS FOR TRANSMITTING AN OFDM SIGNAL

(75) Inventor: Peter Loc, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/434,924

(22) Filed: May 4, 2009

Related U.S. Application Data (63) Continuation of application No. 11/143,049, filed on Jun. 2, 2005, now Pat. No. 7,529,178.

(60) Provisional application No. 60/653,220, filed on Feb. 14, 2005, provisional application No. 60/685,522, filed on May 27, 2005.

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ..................... 370/208; 370/476
(58) Field of Classification Search .............. 370/208, 370/338, 350, 332; 375/344, 326, 295
See application file for complete search history.

(56) References Cited

U.S. PATENT DOCUMENTS

| | | | |
|---|---|---|---|
| 5,603,081 A * | 2/1997 | Raith et al. ............. | 455/435.3 |
| 7,054,296 B1 * | 5/2006 | Sorrells et al. ........... | 370/338 |
| 7,061,427 B2 | 6/2006 | Hoffmann et al. | |
| 7,417,974 B2 | 8/2008 | Hansen | |
| 2004/0001563 A1 * | 1/2004 | Scarpa ................... | 375/326 |
| 2005/0025187 A1 | 2/2005 | Li et al. | |
| 2005/0180524 A1 * | 8/2005 | Hansen et al. ........... | 375/295 |
| 2006/0280113 A1 * | 12/2006 | Huo ..................... | 370/208 |

OTHER PUBLICATIONS

Proposed modifications of 802.16 MAC and 802.11a PHY for a wirelessHuman Standard emplying TDD/TDM, Octavian Sarca, Radu Selea Redline Communications Inc. Toronto, Canada, John Sydor, Communications Research Centre Ottwa, Canada, Jan. 15, 2001, IEEE 802.16.4c-01/16 Project IEEE 802.16.4 Broadband Wireless Access Working Group http://ieee802.org/16.*

(Continued)

Primary Examiner—Ricky Ngo
Assistant Examiner—David Oveissi (57) ABSTRACT

An apparatus includes a transmitter to transmit a first orthogonal frequency-division multiplexing signal including a first signal burst with a plurality of first fields of a first type. Each of a plurality of pair fields includes a second field of a second type and a third field of a third type. The second type is different than the first type and the third type is different than the first type and the second type. Each first field in the first signal burst is transmittable prior to a corresponding pair field of the plurality of pair fields. Each second field of a given pair field comprises an indicator to indicate whether a first field is transmitted subsequent to the given pair field. A controller selects a number of pair fields to be transmitted in the first signal burst of the first orthogonal frequency-division multiplexing signal.

12 Claims, 8 Drawing Sheets

OTHER PUBLICATIONS

IEEE Std 802.11a-1999 (Supplement to IEEE Std. 802-11-1999), Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications; High-speed Physical Layer in the 5 GHz Band; Adopted by the ISO/IEC and redesignated as ISO/IEC 8802-11:1999/Amd 1:2000(E), LAN/MAN Standards Committee of the IEEE Computer Society, 91 pages.

IEEE P802.11g/D8.2, Apr. 2003 (Supplement to ANSI/IEEE Std 802.11 1999(Reaff 2003)), Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society, pp. 1-69.

802.11n; IEEE P802.11-04/0889r6; Wireless LANs, TGn Sync Proposal Technical Specification; 131 pages.

* cited by examiner

METHOD AND APPARATUS FOR TRANSMITTING AN OFDM SIGNAL

CROSS-REFERENCE TO RELATED APPLICATIONS

This application is a continuation of U.S. patent application Ser. No. 11/143,049, filed Jun. 2, 2005, which claims the benefit of U.S. Provisional Patent Application No. 60/653,220, filed Feb. 14, 2005, and claims the benefit of U.S. Provisional Patent Application No. 60/685,522, filed May 27, 2005, the disclosures thereof incorporated by reference herein in their entirety.

BACKGROUND

The present invention relates generally to data communications. More particularly, the present invention relates to automatic gain control for orthogonal frequency-division multiplexing (OFDM) receivers in local area network (LAN) systems.

Figure 1:
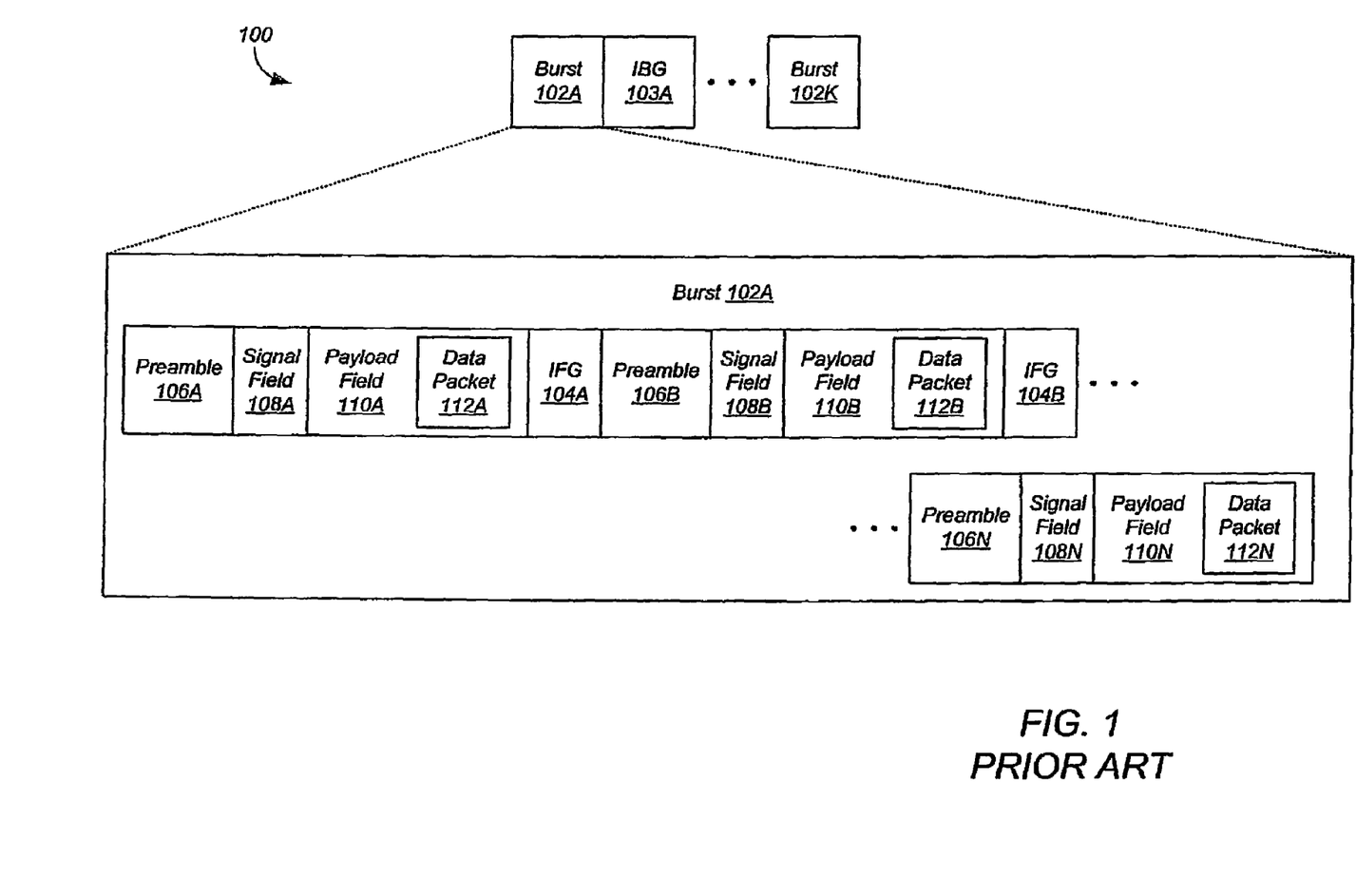
FIG. 1 shows a conventional OFDM WLAN signal comprising a plurality of bursts separated by inter-burst gaps (IBG).

In OFDM wireless LANs (WLANs) such as those specified by IEEE Standard 802.11a, 802.11g, and 802.11n, data is transmitted in bursts of variable duration that are separated by inter-burst gaps of fixed duration. FIG. 1 shows a conventional OFDM WLAN signal 100 comprising a plurality of bursts 102A-K separated by inter-burst gaps (ISG) 103. Each burst 102 comprises a plurality of preamble fields 106A,B-N, each followed by a respective signal field 108A,B-N and a respective payload field 110A,B-N each comprising a packet of data 112A,B-N.

Payload fields 110 comprise packets 112 of variable length, and so are of variable duration, generally on the order of ten or 100 microseconds. In contrast, preamble fields 106 are used by the receiver of signal 100 to acquire signal 100, and so must have a predetermined minimum duration on the order of tens of microseconds. Therefore, in many cases, preambles 106 constitute the majority of the bandwidth of signal 100.

SUMMARY

In general, in one aspect, the invention features an apparatus to communicate data, comprising: a transmitter to transmit an orthogonal frequency-division multiplexing (OFDM) signal comprising a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields; wherein each of the n payload fields comprises a packet of the data; and a controller to select a value of n for each of the signal bursts of the OFDM signal.

Particular implementations can include one or more of the following features. In some embodiments, the controller selects a value of m for each of the signal bursts of the OFDM signal. Some embodiments comprise a receiver to receive a second OFDM signal responsive to the OFDM signal, wherein the second OFDM signal comprises a description of a quality of reception of the OFDM signal; and wherein the controller selects the value of n for each of the signal bursts of the OFDM signal based on the description of the quality of reception of the OFDM signal. In some embodiments, the description of the quality of reception of the OFDM signal comprises at least one of the group consisting of: a number of the packets of the data received; a number of the packets of the data not received; a signal level of the OFDM signal; and a link margin of the OFDM signal. In some embodiments, at least one of the n payload fields is followed by an inter-frame gap; and wherein the one of the n signal fields preceding the at least one of the n payload fields comprises an inter-frame gap value that indicates the duration of the one of the inter-frame gaps following the at least one of the n payload fields. In some embodiments, a second receiver receives the OFDM signal and controls a gain of the OFDM signal based on a signal level of the OFDM signal during each one of the m preambles when the preamble data is set to the predetermined value in the one of the n signal fields preceding the one of the m preambles. In some embodiments, the apparatus is otherwise compliant with at least one standard selected from the group consisting of IEEE standards 802.11a, 802.11g, and 802.11n.

In general, in one aspect, the invention features an apparatus to communicate data, comprising: a transmitter to transmit a signal comprising a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields; wherein each of the n payload fields comprises a packet of the data; and a controller to select a value of n for each of the signal bursts of the signal.

In general, in one aspect, the invention features a method to communicate data, comprising: transmitting a orthogonal frequency-division multiplexing (OFDM) signal comprising a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields; wherein each of the n payload fields comprises a packet of the data; and selecting a values of n for each of the signal bursts of the OFDM signal.

Particular implementations can include one or more of the following features. Some embodiments comprise selecting a value of m for each of the signal bursts of the OFDM signal. Some embodiments comprise receiving a second OFDM signal responsive to the OFDM signal, wherein the second OFDM signal comprises a description of a quality of reception of the OFDM signal; and selecting the value of n for each of the signal bursts of the OFDM signal based on the description of the quality of reception of the OFDM signal. In some embodiments, the description of the quality of reception of the OFDM signal comprises at least one of the group consisting of: a number of the packets of the data received; a number of the packets of the data not received; a signal level of the OFDM signal; and a link margin of the OFDM signal. In some embodiments, at least one of the n payload fields is followed by an inter-frame gap; and wherein the one of the n signal fields preceding the at least one of the n payload fields comprises an inter-frame gap value that indicates the duration of the one of the inter-frame gaps following the at least one of the n payload fields. In some embodiments, a receiver of the OFDM signal controls a gain of the OFDM signal based on a signal level of the OFDM signal during each one of the m preambles when the preamble data is set to the predetermined value in the one of the n signal fields preceding the one of the m preambles. In some embodiments, the method is otherwise compliant with at least one standard selected from the group consisting of IEEE standards 802.11a, 802.11g, and 802.11n.

In general, in one aspect, the invention features an apparatus to communicate data, comprising: a receiver to receive a orthogonal frequency-division multiplexing (OFDM) signal comprising a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields; wherein each of the n payload fields comprises a packet of the data; and an automatic gain control circuit to control a receiver gain of the OFDM signal based on a signal level of the OFDM signal during each one of the m preambles when the preamble data is set to the predetermined value in the one of the n signal fields preceding the one of the m preambles.

Particular implementations can include one or more of the following features. Some embodiments comprise a transmitter to transmit a second OFDM signal, wherein the second OFDM signal comprises a description of a quality of reception of the OFDM signal. Some embodiments comprise wherein a second transmitter transmits the OFDM signal, receives the second OFDM signal and selects the value of n for each of the signal bursts of the OFDM signal based on the description of the quality of reception of the OFDM signal. In some embodiments, the description of the quality of reception of the OFDM signal comprises at least one of the group consisting of: a number of the packets of the data received; a number of the packets of the data not received; a signal level of the OFDM signal; and a link margin of the OFDM signal. In some embodiments, at least one of the n payload fields is followed by an inter-frame gap; and wherein the one of the n signal fields preceding the at least one of the n payload fields comprises an inter-frame gap value that indicates the duration of the one of the inter-frame gaps following the at least one of the n payload fields. In some embodiments, the apparatus is otherwise compliant with at least one standard selected from the group consisting of IEEE standards 802.11a, 802.11g, and 802.11n.

In general, in one aspect, the invention features an apparatus to communicate data, comprising: a receiver to receive a signal comprising a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields; wherein each of the n payload fields comprises a packet of the data; and an automatic gain control circuit to control a receiver gain of the signal based on a signal level of the signal during each one of the m preambles when the preamble data is set to the predetermined value in the one of the n signal fields preceding the one of the m preambles.

In general, in one aspect, the invention features a method to communicate data, comprising: receiving a orthogonal frequency-division multiplexing (OFDM) signal comprising a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields; wherein each of the n payload fields comprises a packet of the data; and controlling a receiver gain of the OFDM signal based on a signal level of the OFDM signal during each one of the m preambles when the preamble data is set to the predetermined value in the one of the n signal fields preceding the one of the m preambles.

Particular implementations can include one or more of the following features. Some embodiments comprise transmitting a second OFDM signal, wherein the second OFDM signal comprises a description of a quality of reception of the OFDM signal. In some embodiments, a transmitter of the OFDM signal receives the second OFDM signal and selects the value of n for each of the signal bursts of the OFDM signal based on the description of the quality of reception of the OFDM signal. In some embodiments, the description of the quality of reception of the OFDM signal comprises at least one of the group consisting of: a number of the packets of the data received; a number of the packets of the data not received; a signal level of the OFDM signal; and a link margin of the OFDM signal. In some embodiments, at least one of the n payload fields is followed by an inter-frame gap; and wherein the one of the n signal fields preceding the at least one of the n payload fields comprises an inter-frame gap value that indicates the duration of the one of the inter-frame gaps following the at least one of the n payload fields. In some embodiments, the method is otherwise compliant with at least one standard selected from the group consisting of IEEE standards 802.11a, 802.11g, and 802.11n.

In general, in one aspect, the invention features a signal comprising: a plurality of signal bursts each comprising m preamble fields, n payload fields, and n signal fields; wherein m<n; wherein each of the m preamble fields comprises a plurality of training sequences; wherein each of the n payload fields is preceded by one of the n signal fields; wherein each one of the n signal fields comprises information describing the following one of the n payload fields, and preamble data, wherein the preamble data in one of the n payload fields is set to a predetermined value only when one of the m preambles occurs between the one of the n signal fields and the next one of the n signal fields.

Particular implementations can include one or more of the following features. In some embodiments, at least one of the n payload fields is followed by an inter-frame gap; and wherein the one of the n signal fields preceding the at least one of the n payload fields comprises an inter-frame gap value that indicates the duration of the one of the inter-frame gaps following the at least one of the n payload fields. In some embodiments, the signal is an orthogonal frequency-division multiplexing (OFDM) signal. In some embodiments, the signal is otherwise compliant with at least one standard selected from the group consisting of IEEE standards 802.11a, 802.11g, and 802.11n.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention produce and utilize a signal comprising one or more signal bursts each comprising fewer preamble fields than data fields. While embodiments of the present invention are discussed in terms of OFDM WLAN signals such as those specified by IEEE Standard 802.11a, 802.11g, and 802.11n, other embodiments employ other signals, including point-to-point signals as well as network signals. In addition, embodiments of the present invention are not limited to wireless communications.

Figure 2:
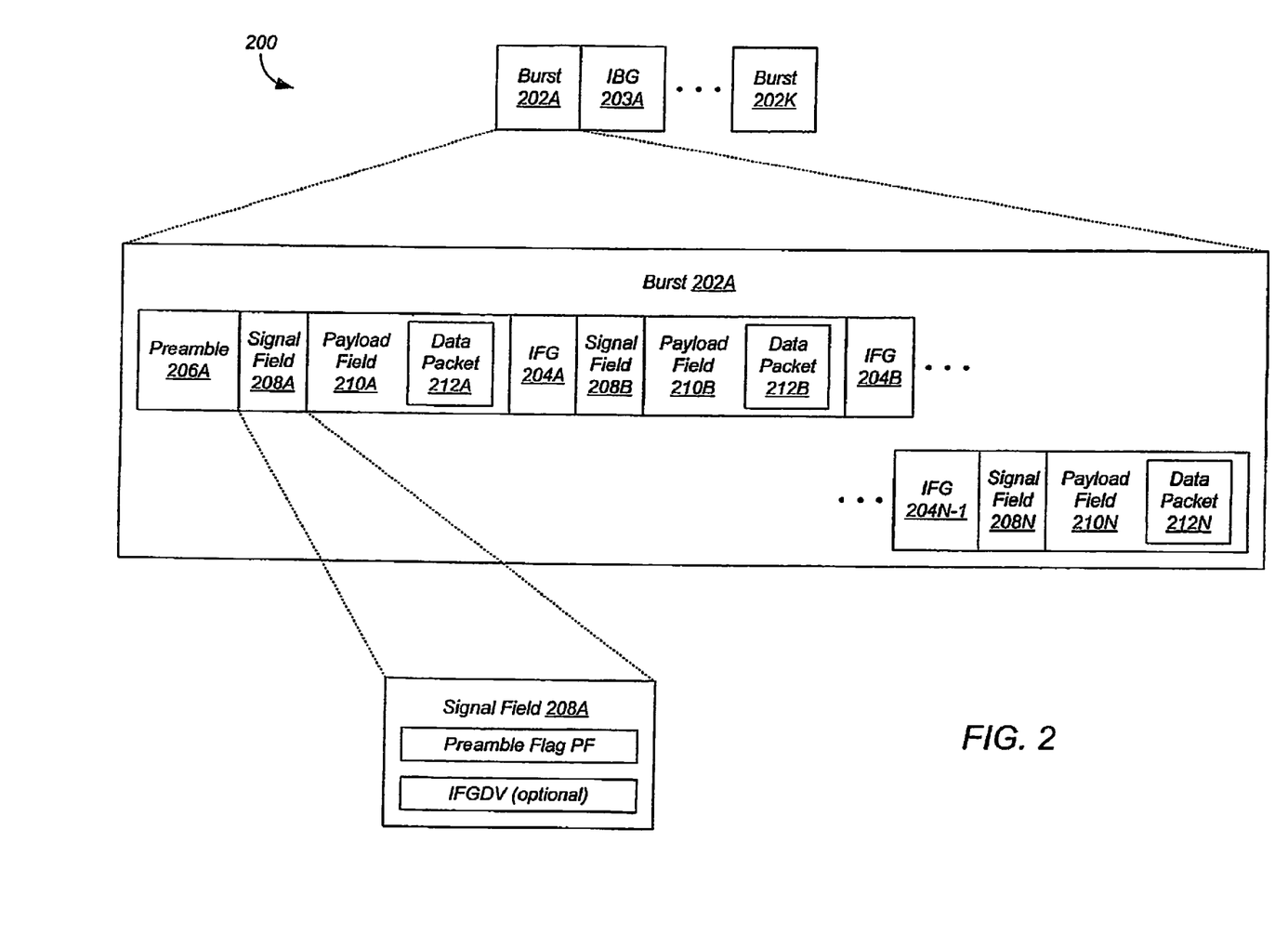
FIG. 2 shows a OFDM WLAN signal comprising a plurality of bursts each comprising only one preamble and multiple data packets according to a preferred embodiment of the present invention.

FIG. 2 shows a OFDM WLAN signal 200 comprising a plurality of bursts 202A-K each comprising only one preamble 206 and multiple data packets 212 according to a preferred embodiment of the present invention. Bursts 202 are separated by inter-burst gaps (IBG) 203. Each burst 202 comprises one preamble field 206 and N payload fields 210A, B-N where N>1, each preceded by a respective signal field 208A,B-N. Each payload field 210 (except the last in a burst 202) is followed by a respective inter-frame gap (IFG) 204A, B-N-1.

Preamble fields 206 contain training sequences that allow receivers of signal 200 to acquire signal 200, and to set a receiver gain for signal 200, as is well-known in the relevant arts. Each signal field 208 comprises information describing the following payload field 210 such as data rate, the number of antennas used for multiple-input multiple-output (MIMO) systems, and the like, as is also well-known in the relevant arts. Each payload field 210A-N comprises a respective packet of data 212A-N.

The value of N can be fixed or can be selected dynamically by a transmitter of signal 200, for example based on feedback describing the quality of reception of signal 200 by a receiver of signal 200. One advantage of signal 200 over prior art signal 100 is that, by using fewer preambles, the effective data bandwidth of signal 200 is greater.

In order for a receiver of signal 200 to properly utilize preamble fields 206, the receiver must predict when a preamble field 206 is due to arrive at the receiver. In conventional signals such as signal 100 of FIG. 1, each inter-frame gap 104 has a known, fixed duration, and is followed by a preamble 106 having a known, fixed duration. Therefore a receiver can easily predict the arrival of each preamble 106.

But in signal 200 not every inter-frame gap 204 is followed by a preamble 206. Therefore, according to a preferred embodiment, each signal field 208 comprises preamble data such as a preamble flag (PF) that is set to a predetermined value only when a preamble 206 occurs between that signal field 208 and the next one of the signal fields 208. For example, referring to FIG. 2, preamble flag PF is clear in each of the signal fields 208A through 208N-1, but is set in signal field 208N.

Referring again to FIG. 2, the inventor has recognized that the duration of each inter-frame gap 204 that is not followed by a preamble can be reduced. Therefore, according to some embodiments, each signal field 208 includes an optional inter-frame gap duration value (IFGDV) that indicates the duration of the next inter-frame gap 204. For example, the IFGDV can be a two-bit binary number indicating one of four durations ranging from two to eight microseconds. As another example, the IFGDV can be a gap flag GF indicating one of two predetermined durations: a "normal" duration for a inter-frame gap 204 that immediately precedes a preamble 206 and a "short" duration when no preamble 206 immediately follows the inter-frame gap 204. In some embodiments, a single flag is used for both preamble and gap. That is, when the single flag is set, a preamble 206 immediately follows the next inter-frame gap 204 so a long gap duration is used, and when the single flag is clear, no preamble 206 immediately follows the next inter-frame gap 204 so a short gap duration is used.

In some embodiments, the signal bursts are so long that it is useful to change the receiver gain multiple times during a single burst. Therefore some embodiments of the present invention include two or more preambles in each burst. In particular, these bursts comprise m preambles, n signal fields, and n payload fields, where m<n.

Figure 3:
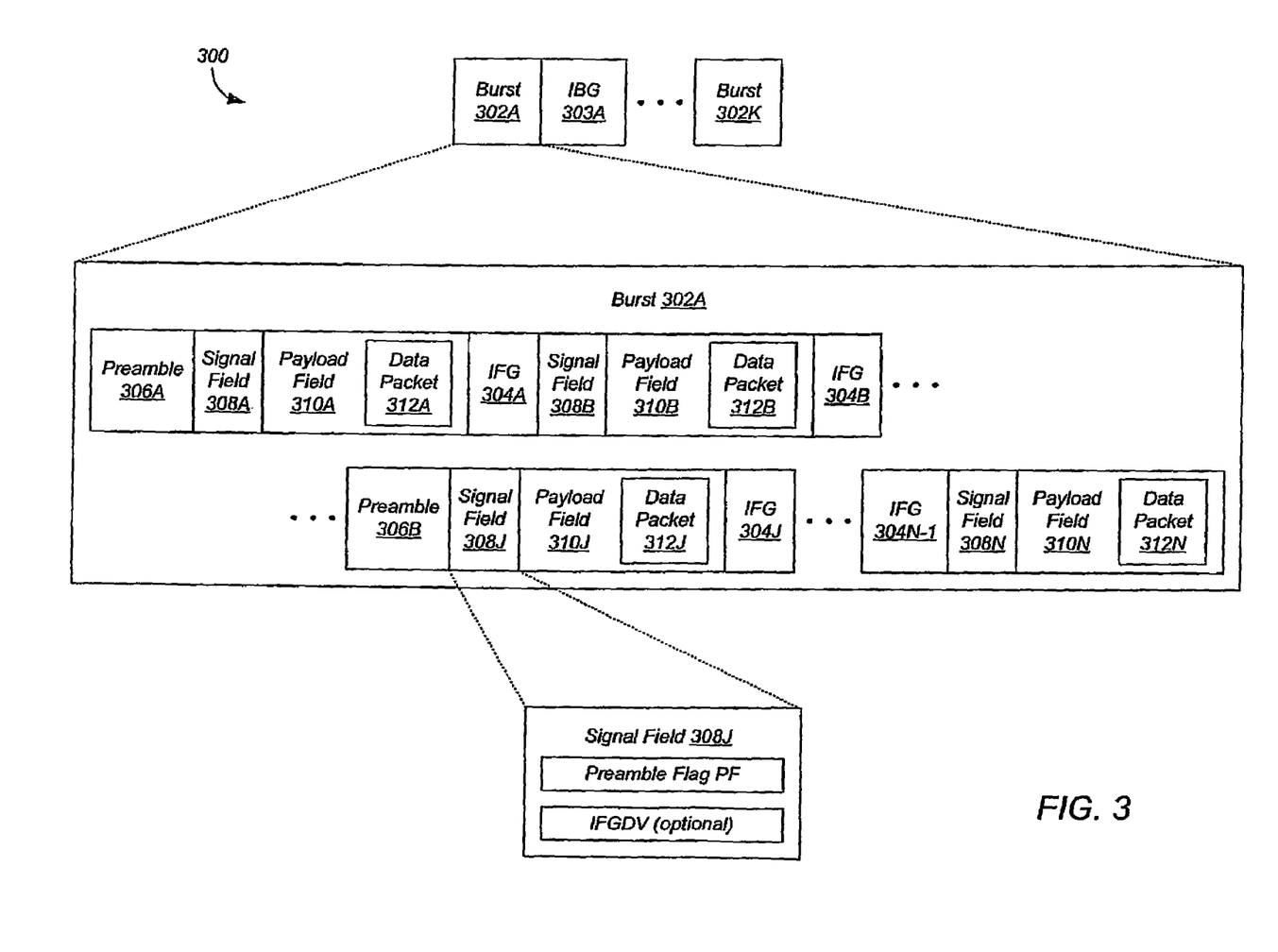
FIG. 3 shows a OFDM WLAN signal comprising multiple bursts each comprising multiple preambles and multiple data packets according to a preferred embodiment of the present invention.

FIG. 3 shows a OFDM WLAN signal 300 comprising multiple bursts 302A-K each comprising multiple preambles 306 and multiple data packets 312 according to a preferred embodiment of the present invention. Bursts 302 are separated by inter-burst gaps (IBG) 303. Each burst 302 comprises M preamble fields 306A-M and N payload fields 310A-N each preceded by a signal field 308A-N where M>N. Each payload field 310 (except the last in a burst 302) is followed by a respective inter-frame gap (IFG) 304A-N-1.

Preamble fields 306 contain training sequences that allow receivers of signal 300 to acquire signal 300, and to set a receiver gain for signal 300, as is well-known in the relevant arts. Each signal field 308 comprises information describing the following payload field 310 such as data rate, the number of antennas used for MIMO systems, and the like, as is also well-known in the relevant arts. Each payload field 310A-N comprises a respective packet of data 312A-N.

The values of N and M can be fixed or can be selected dynamically by a transmitter of signal 300, for example based on feedback describing the quality of reception of signal 300 by a receiver of signal 300. One advantage of signal 300 over prior art signal 100 is that, by using fewer preambles, the effective data bandwidth of signal 300 is greater.

To enable a receiver of signal 300 to predict when a preamble field 306 is due to arrive at the receiver, according to a preferred embodiment, each signal field 308 comprises a preamble flag (PF) that is set only when a preamble 306 occurs between that signal field 308 and the next one of the signal fields 308. For example, referring to FIG. 3 when M=2, preamble flag PF is set in burst 302 only in the signal field 308 immediately preceding the second preamble 306B, and in the last signal field 308N.

In some embodiments, signal field 308 includes an inter-frame gap duration value (IFGDV) or gap flag GF that functions as described above for FIG. 2.

Figure 4:
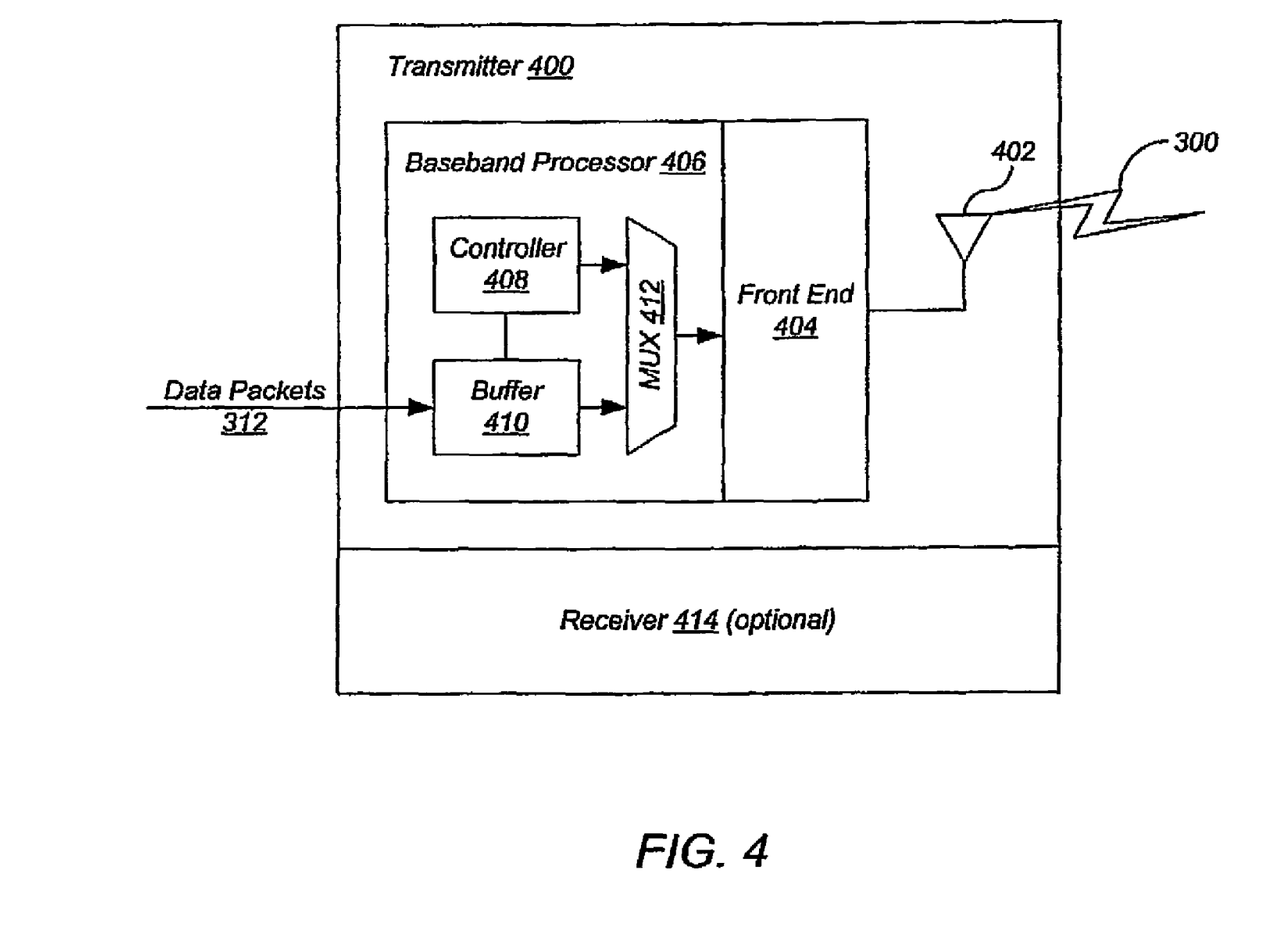
FIG. 4 shows a transmitter according to a preferred embodiment of the present invention.

FIG. 4 shows a transmitter 400 according to a preferred embodiment of the present invention. Transmitter 400 comprises an antenna 402 for transmitting signal 300, a front end 404, and a baseband processor 406. Baseband processor 406 comprises a controller 408, a buffer 410 to store packets 312 of data to be transmitted, and a switch 412 such as a multiplexer (MUX) to pass packets 312 of data from buffer 410 to front end 404, and to pass control data including preambles 306 and signal fields 308 from controller 408 to front end 404. While FIG. 4 indicates one example of a configuration for transmitter 400, embodiments of the present invention are not limited by that configuration. Some embodiment comprise an optional receiver 414 to receive feedback information from a receiver of signal 300. In some embodiments, transmitter 400 is otherwise compliant with at least one standard selected from the group consisting of IEEE standards 802.11a, 802.11g, and 802.11n.

Figure 5:
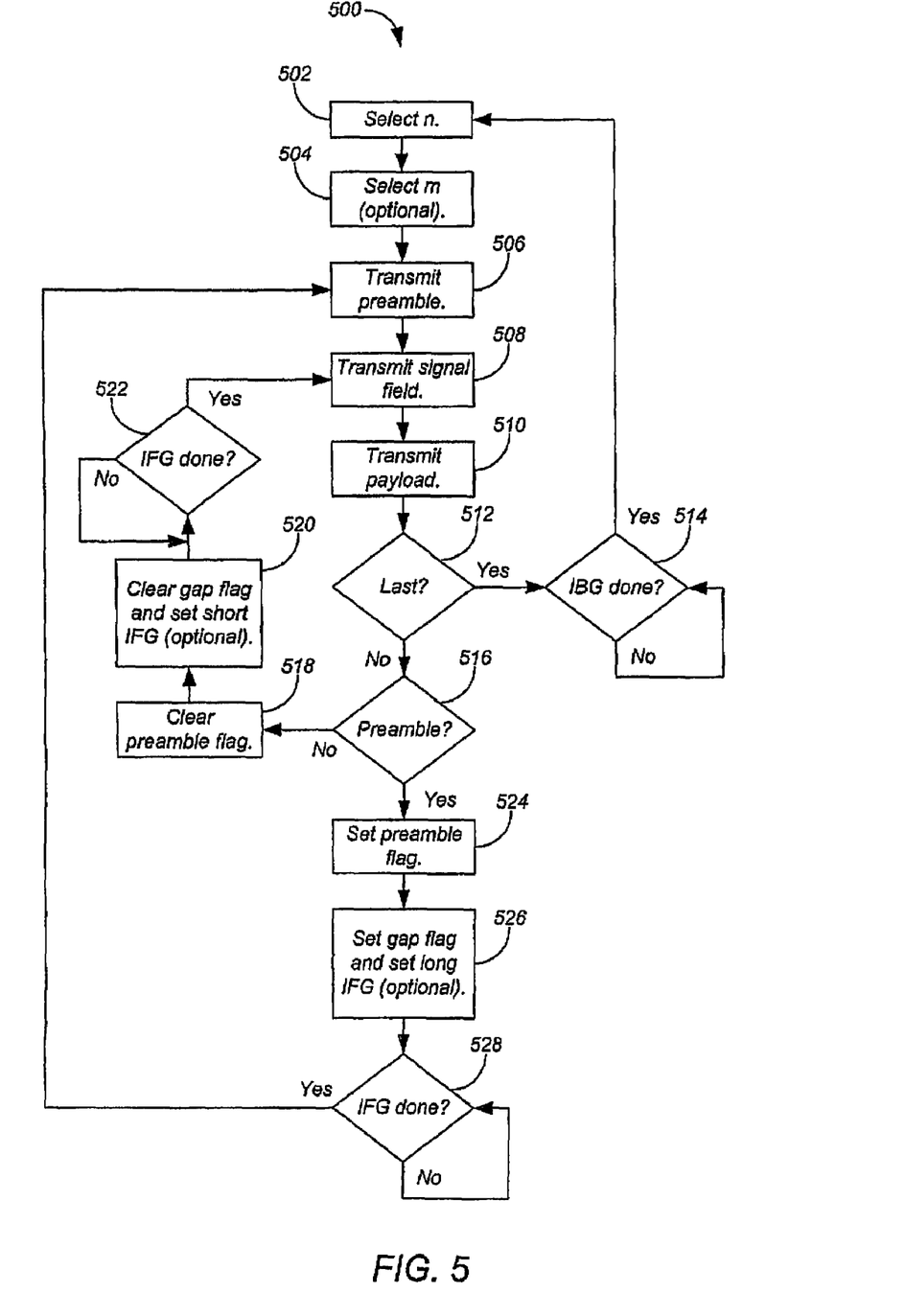
FIG. 5 shows a process for the transmitter of FIG. 4 according to a preferred embodiment.

FIG. 5 shows a process 500 for transmitter 400 of FIG. 4 according to a preferred embodiment. In the example of FIG. 5, the inter-frame gap duration value is represented by a gap flag GF that when clear indicates a "normal" duration for the next inter-frame gap 304 (for example, on the order of 2 microseconds), and when set indicates a "short" duration for the next inter-frame gap 304 (for example, on the order of a fraction of a microsecond).

Baseband processor 406 receives packets 312 of data to be transmitted, and buffers the packets 312 in transmit buffer 410. Controller 408 of baseband processor 406 optionally selects a number n of signal fields 308 and payload fields 310 to be transmitted in each of one or more subsequent signal bursts 302 to be transmitted (step 502). The number n can be fixed within transmitter 400, can be communicated to transmitter 400, or can be selected by controller 408 of transmitter 400, for example based upon feedback from a receiver of the transmitted signal 300. For example, receiver 414 can receive a description of a quality of reception of signal 300 that comprises a number of the packets 312 of the data received, a number of the packets 312 of the data not received, a signal level of wireless signal 300, a link margin of the wireless signal 300, and the like.

In embodiments where more that one preamble 306 can be transmitted in each signal burst 302, controller 408 optionally selects a number m of preambles 306 to be transmitted in each of one or more subsequent signal bursts 302 to be transmitted (step 504), where m≦n, and selects the location of each preamble 306 within signal bursts 302. The number m and location of preambles 306 can be fixed within transmitter 400, can be communicated to transmitter 400, or can be selected by controller 408 of transmitter 400, for example based upon feedback from a receiver of the transmitted signal 300 such as the feedback described above.

Transmitter 400 then transmits a preamble 306 (step 506), followed by a signal field 308 (step 508). Transmitter 400 then transmits a payload field 310 comprising a packet 312 of data (step 510). If the last payload field 310 of burst 302 has been transmitted (step 512), then transmitter 400 waits until the next inter-burst gap 303 is done (step 514), and then resumes process 500 at step 502.

But if at step 512 one or more further payload fields 310 remain to be transmitted in burst 302, controller 408 determines whether a further preamble 306 should be transmitted first (step 516). If not, controller 408 clears preamble flag PF in signal field 308 (step 518) and optionally clears gap flag GF, if used, and sets a short duration for inter-frame gap 304 (step 520). Transmitter 400 then waits until the inter-frame gap is done (step 522), and then transmits signal field 308 (resuming process 500 at step 508).

But if at step 516 another preamble 306 is to be transmitted, controller 408 sets preamble flag PF in signal field 308 (step 524) and optionally sets gap flag GF, if used, and sets a long duration for inter-frame gap 304 (step 526). Transmitter 400 then waits until the inter-frame gap is done (step 528), and then transmits preamble field 306 (resuming process 500 at step 506).

Figure 6:
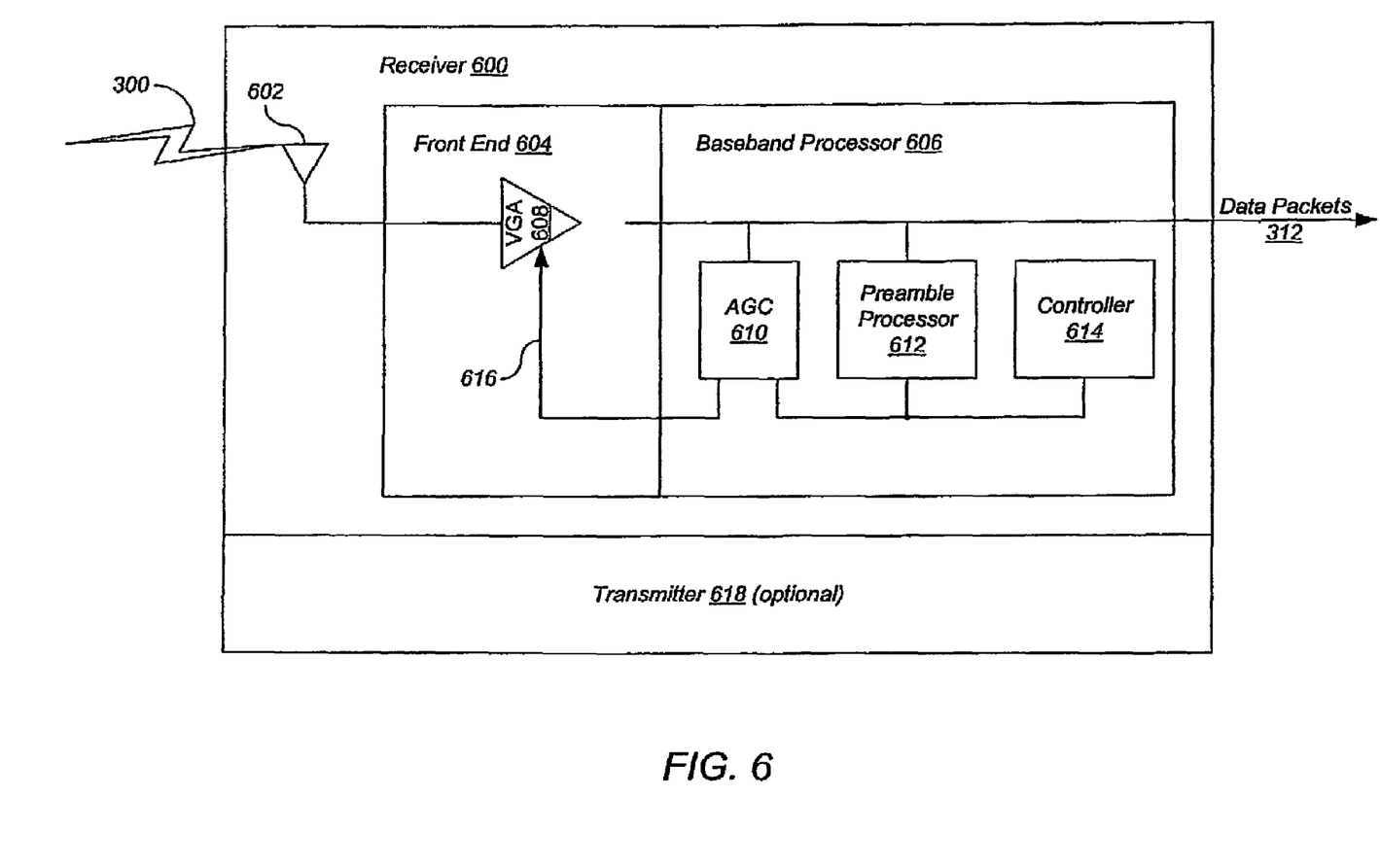
FIG. 6 shows a receiver according to a preferred embodiment of the present invention.

FIG. 6 shows a receiver 600 according to a preferred embodiment of the present invention. Receiver 600 comprises an antenna 602 for receiving signal 300, a front end 604, and a baseband processor 606. Front end 604 comprises a variable-gain amplifier (VGA) 608. Preferably VGA 608 applies a receiver gain to signal 300 at a radio frequency (RF). However, other embodiments provide gain at intermediate frequency (IF) and/or at baseband instead of, or as well as, at RF.

Baseband processor 606 comprises an automatic gain control circuit (AGC) 610, a preamble processor 612, and a controller 614. While FIG. 6 indicates one example of a configuration for receiver 600, embodiments of the present invention are not limited by that configuration. Some embodiments comprise an optional transmitter 618 to send feedback information to a transmitter of signal 300. In some embodiments, receiver 600 is otherwise compliant with at least one standard selected from the group consisting of IEEE standards 802.11a, 802.11g, and 802.11n.

Figure 7:
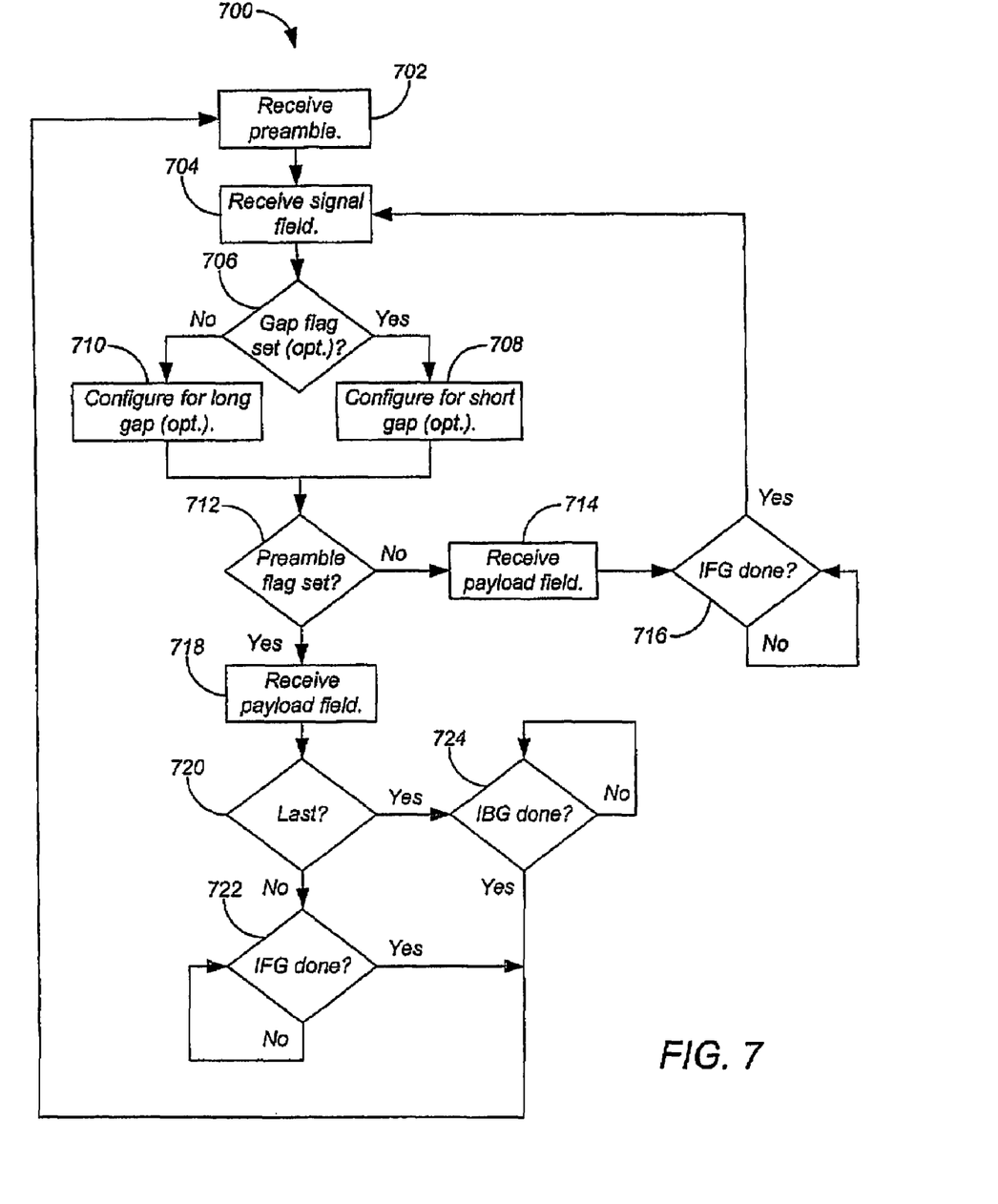
FIG. 7 shows a process for the receiver of FIG. 6 according to a preferred embodiment.

FIG. 7 shows a process 700 for receiver 600 of FIG. 6 according to a preferred embodiment. In the example of FIG. 7, the inter-frame gap duration value is represented by a gap flag GF that when clear indicates a "normal" duration for the next inter-frame gap 304 (for example, on the order of 2 microseconds), and when set indicates a "short" duration for the next inter-frame gap 304 (for example, on the order of a fraction of a microsecond).

Receiver 600 receives a preamble 306 in a burst 302 of wireless signal 300 (step 702). Preamble processor 612 processes the preamble 306 to acquire and synchronize with signal burst 302. Receiver 600 also sets a receiver signal gain while receiving preamble 306. In particular, automatic gain control circuit (AGC) 610 controls the receiver gain of wireless signal 300 based on the signal level of wireless signal 300 during preamble 306 when preamble flag PF is set in the signal field 308 preceding the preamble 306. Note that when preamble 306 is the first preamble 306 in signal burst 302, it is assumed that preamble flag PF was set in the last signal field 308 of the previous signal burst 302. In the embodiment of FIG. 1, AGC circuit 610 detects a level of signal 300 during preamble 306 and generates a gain control signal 616 that is provided to VGA 608. VGA 608 applies a receiver gain to signal 300 in accordance with gain control signal 616. At the end of preamble 306, the receiver gain is held constant until the start of the next preamble 306 received.

Receiver 600 receives the signal field 308 that follows preamble 306 (step 704). Controller 614 of receiver 600 optionally checks the gap flag GF in the signal field 308 (step 706). If gap flag GF is set, controller 614 optionally configures baseband processor 606 in accordance with a short duration for the next inter-frame gap 304 (step 708). If gap flag GF is clear, controller 614 optionally configures baseband processor 606 in accordance with a long duration for the next inter-frame gap 304 (step 710).

Controller 614 checks the preamble flag PF in the signal field 308 (step 712). If the preamble flag PF is clear, no preamble 306 precedes the next signal field 308, so after receiving and processing the payload field 310 following the signal field 308 (step 714), receiver 600 waits (step 716) for the inter-frame gap 304 duration established in steps 706-710 before receiving and processing the next signal field 308 (resuming at step 704).

But if at step 712 the preamble flag PF in the signal field 308 is set, a preamble 306 precedes the next signal field 308. The preamble 306 could be part of the same burst as the previous preamble 306, but if the signal field 308 having the preamble flag PF set is the last in a burst 302, the preamble 306 is part of the next burst 302. Therefore, after receiving and processing the payload field 310 following the signal field 308 (step 718), if that payload field 310 is not the last in the burst 302 (step 720), receiver 600 waits (step 722) for the inter-frame gap 304 duration established in steps 706-710 before receiving and processing the next preamble 306 (resuming at step 702). But if that payload field 310 is the last in the burst 302 (step 720), receiver 600 waits (step 724) for the inter-burst gap 303 duration before receiving and processing the next preamble 306, which is the first in the next burst 302 (resuming at step 702).

Figure 8:
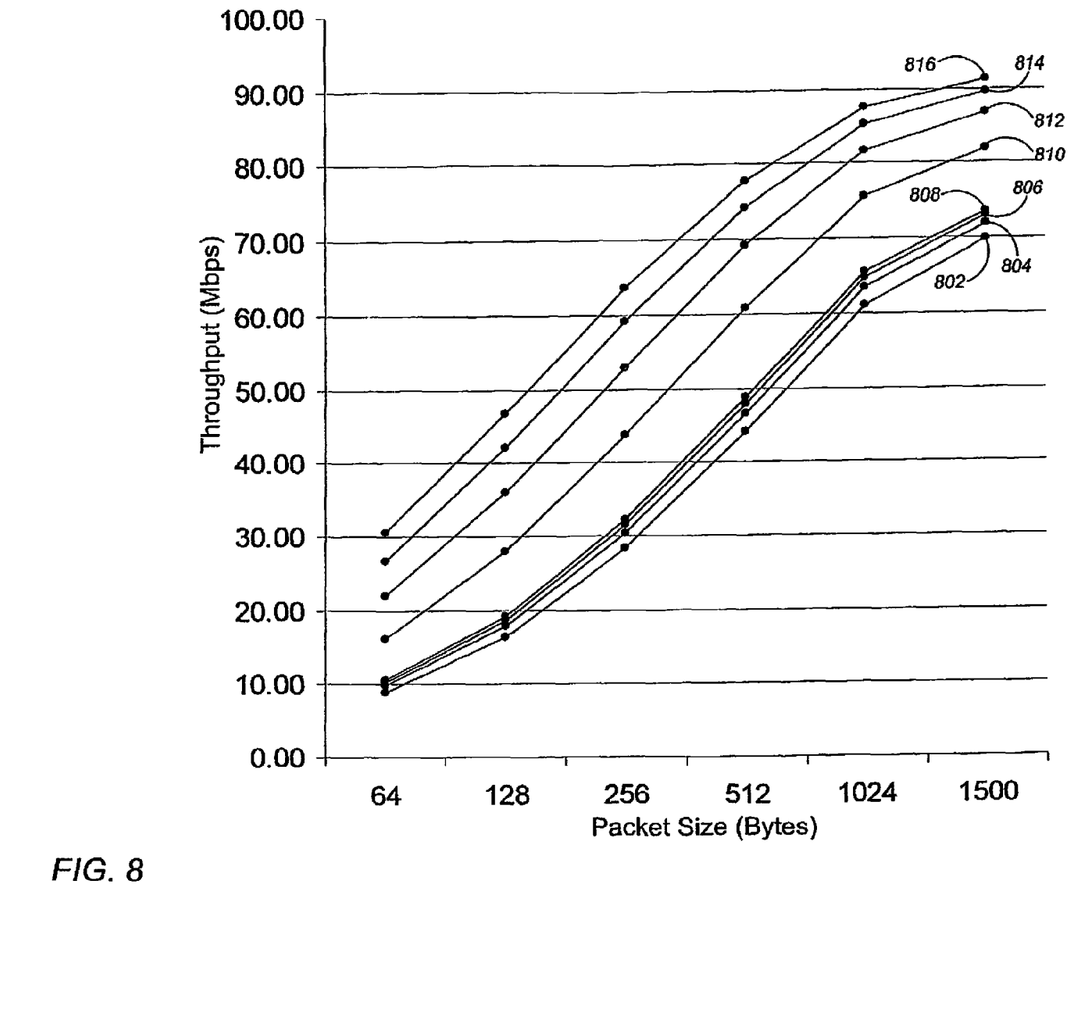
FIG. 8 shows eight plots of throughput (Mbps) vs. packet size (Bytes).

Embodiments of the present invention produce significant improvements in data throughput, especially for small packets. FIG. 8 shows eight plots of throughput (Mbps) vs. packet size (Bytes). For each of the plots, the physical data rate is 100 Mbps, the preamble duration is 50 microseconds, the inter-frame gap duration is 2 microseconds, and the inter-burst gap duration is 50 microseconds. As can be seen from FIG. 8, embodiments of the present invention are capable of increasing data throughput substantially.

Curve 802 represents a conventional system operating at a burst size (that is, the number of data packets in each burst) of 5, while curve 810 represents a system according to a preferred embodiment of the present invention, also operating at a burst size of 5.

Curve 804 represents a conventional system operating at a burst size of 10, while curve 812 represents a system according to a preferred embodiment of the present invention, also operating at a burst size of 10.

Curve 806 represents a conventional system operating at a burst size of 20, while curve 814 represents a system according to a preferred embodiment of the present invention, also operating at a burst size of 20.

Curve 808 represents a conventional system operating at a burst size of 50, while curve 816 represents a system according to a preferred embodiment of the present invention, also operating at a burst size of 50.

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    a transmitter configured to transmit a first orthogonal frequency-division multiplexing signal, the first orthogonal frequency-division multiplexing signal comprising a first signal burst, the first signal burst comprising
    a plurality of first fields of a first type, and
    a plurality of pair fields, each of the pair fields comprising a second field of a second type and a third field of a third type, the second type being different than the first type, the third type being different than the first type and the second type,
    wherein each of the first fields is transmittable prior to a corresponding one of the pair fields, and
    wherein the second field of one of the pair fields comprises an indicator to indicate (i) whether one of the first fields is transmitted subsequent to the one of the pair fields, and (ii) a duration of an inter-frame gap following the one of the pair fields; and
    a controller configured to select a first number of the pair fields to be transmitted in the first signal burst of the first orthogonal frequency-division multiplexing signal.

2. The apparatus of claim 1, wherein the controller selects a second number of the first fields to be transmitted in the first signal burst.

3. The apparatus of claim 2, wherein the second number of the first fields to be transmitted in the first signal burst is less than the first number of the pair fields to be transmitted in the first signal burst.

4. The apparatus of claim 1, further comprising:
    a receiver configured to receive a second orthogonal frequency-division multiplexing signal responsive to the first orthogonal frequency-division multiplexing signal, the second orthogonal frequency-division multiplexing signal comprising information corresponding to a quality of reception of the first orthogonal frequency-division multiplexing signal,
    wherein the controller selects a second number of the pair fields to be transmitted in a second signal burst based on the information corresponding to the quality of reception of the first orthogonal frequency-division multiplexing signal.

5. The apparatus of claim 1, wherein:
    each of the first fields comprises a preamble field;
    the second field of each of the pair fields comprises a signal field; and
    the third field of each of the pair fields comprises a payload field.

6. The apparatus of claim 1, wherein the apparatus is compliant with a standard selected from the group consisting of IEEE standards 802.11a, 802.11g, and 802.11n.

7. A device comprising the apparatus of claim 1.

8. A method comprising:
    transmitting a first orthogonal frequency-division multiplexing signal, the first orthogonal frequency-division multiplexing signal comprising a first signal burst, the first signal burst comprising
    a plurality of first fields of a first type and
    a plurality of pair fields, each of the pair fields comprising a second field of a second type and a third field of a third type, the second type being different than the first type, the third type being different than the first type and the second type
    wherein each of the first fields is transmittable prior to a corresponding one of the pair fields, and
    wherein the second field of one of the pair fields comprises an indicator to indicate (i) whether one of the first fields is transmitted subsequent to the one of the pair fields, and (ii) a duration of an inter-frame gap following the one of the pair fields; and determining a first number of the pair fields to be transmitted in the first signal burst of the first orthogonal frequency-division multiplexing signal.

9. The method of claim 8, further comprising determining a second number of the first fields to be transmitted in the first signal burst.

10. The method of claim 9, wherein the second number of the first fields to be transmitted in the first signal burst is less than the first number of the pair fields to be transmitted in the first signal burst.

11. An apparatus comprising:
a transmitter configured to transmit a first orthogonal frequency-division multiplexing signal, the first orthogonal frequency-division multiplexing signal comprising a first signal burst, the first signal burst comprising a plurality of first fields of a first type, and a plurality of pair fields, each of the pair fields comprising a second field of a second type and a third field of a third type, the second type being different than the first type, the third type being different than the first type and the second type, wherein one of the first fields is transmittable prior to a corresponding one of the pair fields, and wherein the second field of one of the pair fields comprises an indicator to indicate whether one of the first fields is transmitted subsequent to the one of the pair fields; and a controller configured to select a first number of the pair fields to be transmitted in the first signal burst of the first orthogonal frequency-division multiplexing signal; and a receiver configured to receive a second orthogonal frequency-division multiplexing signal responsive to the first orthogonal frequency-division multiplexing signal, the second orthogonal frequency-division multiplexing signal comprising information corresponding to a quality of reception of the first orthogonal frequency-division multiplexing signal, wherein the controller selects a second number of the pair fields to be transmitted in a second signal burst based on the information corresponding to the quality of reception of the first orthogonal frequency-division multiplexing signal.

12. A method comprising:

transmitting a first orthogonal frequency-division multiplexing signal, the first orthogonal frequency-division multiplexing signal comprising a first signal burst, the first signal burst comprising a plurality of first fields of a first type, and a plurality of pair fields, each of the pair fields comprising a second field of a second type and a third field of a third type, the second type being different than the first type, the third type being different than the first type and the second type, wherein each of the first fields in the first signal burst is transmittable prior to a corresponding one of the pair fields, and wherein the second field of one of the pair fields comprises an indicator to indicate whether one of the first fields is transmitted subsequent to the one of the pair fields;

determining a first number of the pair fields to be transmitted in the first signal burst of the first orthogonal frequency-division multiplexing signal;

receiving a second orthogonal frequency-division multiplexing signal responsive to the first orthogonal frequency-division multiplexing signal, the second orthogonal frequency-division multiplexing signal comprising information corresponding to a quality of reception of the first orthogonal frequency-division multiplexing signal; and selecting a second number of the pair fields to be transmitted in a second signal burst based on the information corresponding to the quality of reception of the first orthogonal frequency-division multiplexing signal.

* * * * *